(12) United States Patent
Ghirardi et al.

(10) Patent No.: US 9,540,181 B2
(45) Date of Patent: Jan. 10, 2017

(54) PALLET FOR CONVEYING PIECES OR COMPONENTS IN ASSEMBLY LINES

(71) Applicant: Comau S.p.A., Grugliasco (Turin) (IT)

(72) Inventors: Ugo Ghirardi, Grugliasco (IT);
Michele Giusto, Grugliasco (IT);
Ermanno Faccin, Grugliasco (IT)

(73) Assignee: COMAU S.P.A., Turin (IT)

( * ) Notice: Subject to any disclaimer, the term of this patent is extended or adjusted under 35 U.S.C. 154(b) by 0 days.

(21) Appl. No.: 14/990,851

(22) Filed: Jan. 8, 2016

(65) Prior Publication Data

US 2016/0221717 A1 Aug. 4, 2016

(30) Foreign Application Priority Data

Feb. 3, 2015 (EP) .................................. 15153558

(51) Int. Cl.
*B65D 19/44* (2006.01)
*B65G 35/06* (2006.01)

(52) U.S. Cl.
CPC .................................... *B65G 35/06* (2013.01)

(58) Field of Classification Search
CPC ..................... B65D 19/44; B65D 2519/00781; B65D 2519/00815
USPC ...... 108/55.1, 55.3, 55.5, 51.11; 269/55, 12, 269/17; 414/589, 590, 760
See application file for complete search history.

(56) References Cited

U.S. PATENT DOCUMENTS

| | | | |
|---|---|---|---|
| 2,624,473 A | 1/1953 | Corder | |
| 2,825,477 A * | 3/1958 | Ross | B25H 1/0007 269/12 |
| 3,185,318 A * | 5/1965 | Lewis, Sr. | B25H 1/16 187/244 |
| 4,063,650 A * | 12/1977 | Homer | B63B 35/4413 105/29.1 |
| 4,151,922 A * | 5/1979 | Krumme | B66C 17/06 134/76 |
| 4,481,972 A * | 11/1984 | Stavlo | B65D 19/08 108/55.1 |
| 4,943,020 A * | 7/1990 | Beaucoup | B23Q 1/48 248/123.11 |
| 6,368,048 B2 * | 4/2002 | Womble | B62B 3/104 414/590 |
| 7,044,065 B2 * | 5/2006 | Arai | B65D 19/12 108/53.1 |
| 7,077,067 B2 * | 7/2006 | Bodde | B65D 19/44 108/55.1 |
| 2009/0266275 A1 * | 10/2009 | Feeney | B64F 5/0036 108/55.1 |

(Continued)

OTHER PUBLICATIONS

European Search Report in corresponding EP15153558 dated Jul. 29, 2015.

*Primary Examiner* — Jose V Chen
(74) *Attorney, Agent, or Firm* — Young Basile Hanlon & MacFarlane, P.C.

(57) ABSTRACT

A pallet for conveying pieces or components in assembly lines. The pallet includes a base structure, a rotatable platform above the base structure, a pair of vertical uprights, a pair of vertical columns respectively supported within said vertical uprights and an arch-shaped cross-member selectively engageable with the vertical columns. The arch cross-member selectively connected to an assembly component whereby the component may selectively be positioned at different heights and angular orientations to the platform and base for ease of access to the component by a user.

6 Claims, 12 Drawing Sheets

(56) References Cited

U.S. PATENT DOCUMENTS

| | | | |
|---|---|---|---|
| 2010/0054901 A1* | 3/2010 | Lin | H01L 21/681 414/590 |
| 2011/0070061 A1* | 3/2011 | Scelfo | B65D 19/38 414/781 |
| 2011/0101586 A1 | 5/2011 | Lands et al. | |
| 2011/0222999 A1* | 9/2011 | Kubota | B25J 9/101 414/590 |
| 2012/0110816 A1* | 5/2012 | Groves | B62B 3/10 29/428 |
| 2014/0259663 A1 | 9/2014 | Scelsi et al. | |

\* cited by examiner

PALLET FOR CONVEYING PIECES OR COMPONENTS IN ASSEMBLY LINES

FIELD OF THE INVENTION

The present invention relates to a pallet for conveying pieces or components in assembly lines.

BACKGROUND

In modern assembly lines, particularly in the automotive field, pieces or basic components advance along a pallet conveyor line through a number of assembly stations, where further parts and components are subsequently assembled on the basic component carried by each pallet. The assembly operations are performed by operators and/or with the aid of automated assembly systems. In assembly lines of this type, there is the need of rendering the assembly operations as easy and quick as possible, both in order to increase productivity of the line and also in order to ensure that the workers can operate as much as possible without any physical stresses. Rendering the manual operations easy and convenient firstly achieves the advantage of a physical well-being of the operators and then it goes also to the advantage of productivity. Satisfying these needs in an optimal way also involves the capability of easily and quickly adapting the features of the assembly system to the physical features of the operators at each assembly station along the line.

SUMMARY OF INVENTION

The object of the present invention is that of providing a pallet for assembly lines of the above indicated type which satisfies all the above mentioned needs in an optimal way, by ensuring in particular a high flexibility both with regard to the manner in which the piece can be oriented, and with regard to the height at which the piece can be positioned.

A further object lies in achieving the above mentioned purpose with a simple and efficient pallet structure, enabling a quick adaptation of the pallet configuration any time that this may be required, even while the pallet is advancing along the assembly line.

In view of achieving these objects, an example of the invention provides a pallet for conveying pieces or components in assembly lines, characterized in that it comprises:

a base structure, which is to be positioned above a conveyor line, a platform mounted above the base structure, a pair of vertical uprights which are spaced apart from each other, extending upwardly starting from two peripheral areas of said rotatable platform, a pair of vertical columns which are respectively supported within said vertical uprights and which are vertically movable between a lowered position and a raised position, each of said uprights being provided with latch means for locking the respective column at a selected vertical position among a plurality of selectable vertical positions between said lowered position and said raised position, an arch-like cross-member having end portions removably coupled with, and above, locating vertical pins projecting from the upper ends of said columns, said cross-member being provided with connecting means for supporting a piece or component in a cantilever fashion in an elevated position with respect to the plane of said rotatable platform, the end portions of said cross-member having apertures for coupling with the pins of said columns both on a first face thereof and on a second face thereof opposite to the first face, so that said cross-member can be positioned on said columns at any of two positions rotated by 180 degrees relative to each other around a horizontal axis extending in the direction of the cross-member, in order to orient a piece or component preliminarily connected to said cross-member in two different positions which are rotated relative to each other by 180 degrees.

Preferably, the above mentioned platform is rotatably mounted centrally around a vertical axis on the base structure and is provided with lock means for holding it locked in a selected position among two or more positions which are differently rotated around said vertical axis.

Due to the above mentioned features, the pallet according to the invention is capable of supporting and orienting the piece according to a plurality of different positions and different orientations, so as to render the assembly operations easy and quick at each assembly station along the line. In particular, the above mentioned arch-like cross-member, which acts as a piece-carrying adapter, can be positioned at different heights between a minimum height and a maximum height with respect to the platform, which enables the position in height of the piece to be adapted optimally to the needs of the operator, both depending upon the height of the operator and depending upon the need to operate on the piece from above or from below. The rotatable platform further enables the operator to orient the piece in the best way in order to operate easily on any side thereof.

For example in the case of an engine assembly line, each engine block is preliminarily connected rigidly to said arch-like cross-member, so that the cross-member with the engine block carried by the cross-member in a cantilever fashion is then placed, with the aid of automated systems, above the upper ends of the vertical columns of the pallet. At each assembly station arranged along the line the piece can be positioned at the most suitable height, also depending upon the height of the operator, by adjusting the vertical position of said columns with respect to the vertical uprights of the pallet. This can be made for example with the aid of automated systems adapted to grip the cross-member and to move it vertically along with the piece carried thereby until the desired position is reached. In a preferred embodiment, the above mentioned latch means which lock each column at a selected vertical position can be constituted for example by a ratchet system, including a rack carried by each column, cooperating with a ratchet pawl carried by the respective upright. The arrangement can be such that for example the column can be freely raised, since the ratchet pawl jumps on the cooperating rack and holds it automatically at a new selected position preventing a fall thereof by gravity.

Also due to the above indicated features, when the piece goes from one station to the other of the assembly line, it can be upturned to make subsequent assembly operations easier due to the possibility of separating the cross member with the piece carried thereby from the vertical columns of the pallet, with subsequent mounting of the cross-member on the columns in an upturned position. Furthermore, the piece can be oriented according to different angles around a vertical axis, due to the possibility of rotation of the platform carried on the base structure of the pallet.

According to a further preferred feature, the above mentioned arch-like cross-member has a third face arranged at 90 degrees with respect to said first and second faces and having coupling elements adapted to cooperate with coupling seats provided on the upper surface of the rotatable platform, so as to hold said cross-member locked in a position resting above the platform.

Due to this further feature, the cross-member with the piece carried thereby can be separated from the upper ends of the vertical columns of the pallet and can be layed down on the rotatable platform while holding the piece, which previously was extending horizontally in a cantilever fashion from the cross-member, according to a vertical orientation, in order to favour assembly operations on the piece itself.

The pallet according to the invention is therefore able to favour a high operational flexibility and an ability of adapting itself easily and quickly to the requirements of each specific application, also from an ergonomical stand point.

BRIEF DESCRIPTION OF THE DRAWING

Further features and advantages of the invention will become apparent from the description which follows with reference to the annexed drawings, given purely by way of non limiting example, in which.

DETAILED DESCRIPTION OF EMBODIMENTS OF THE INVENTION

With reference to the drawings, numeral 1 generally designates a pallet for conveying pieces or components in assembly lines, such as lines for assembling motor-vehicle engines. The drawings specifically show the example of a pallet which is to carry an engine block in a line for assembling motor-vehicles engines. However, the principles which are at the basis of the present invention are generally applicable and therefore can be used in assembly lines of any type.

With reference to FIGS. 1-9, the pallet 1 comprises a base structure 2 on which a rotatable platform 3 is mounted. As shown in detail of FIG. 3, platform 3 is constituted by a planar plate which is rotatably mounted at its centre around a vertical axis X on the base structure 2 of pallet 1. The base structure 2 is also in the form of a plate and is to be positioned on a pallet conveyor line of any type, such as a conveyor line with motorized rollers or chains. The details of construction of the base structure 2, in particular with reference to the parts which are to cooperate with elements of the conveyor line, are not described herein, since they can be made in any known way and since these details, taken alone, do not fall within the scope of the present invention.

Figure 3:
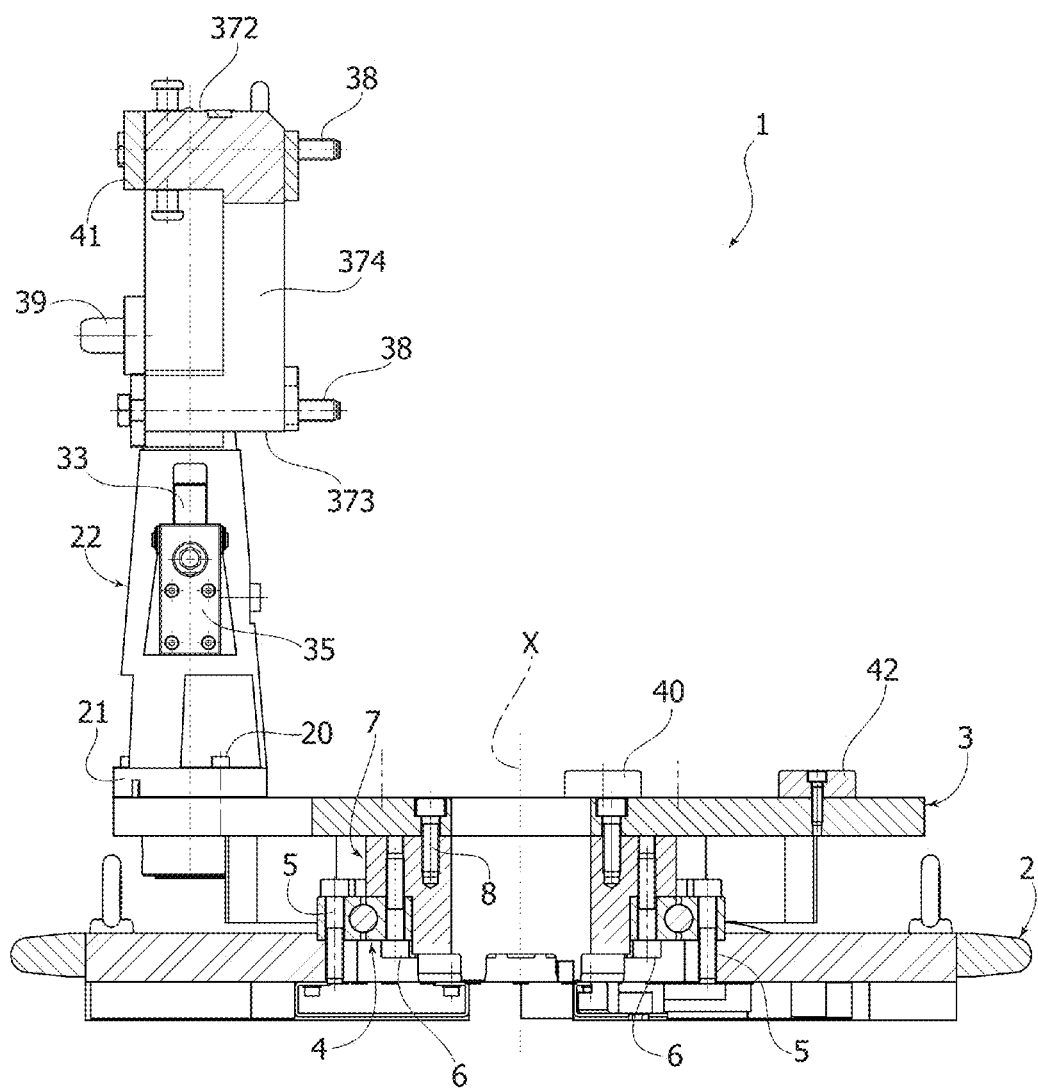
FIG. 3 is a side view and in cross-section of the pallet of FIG. 1.
Figure 4:
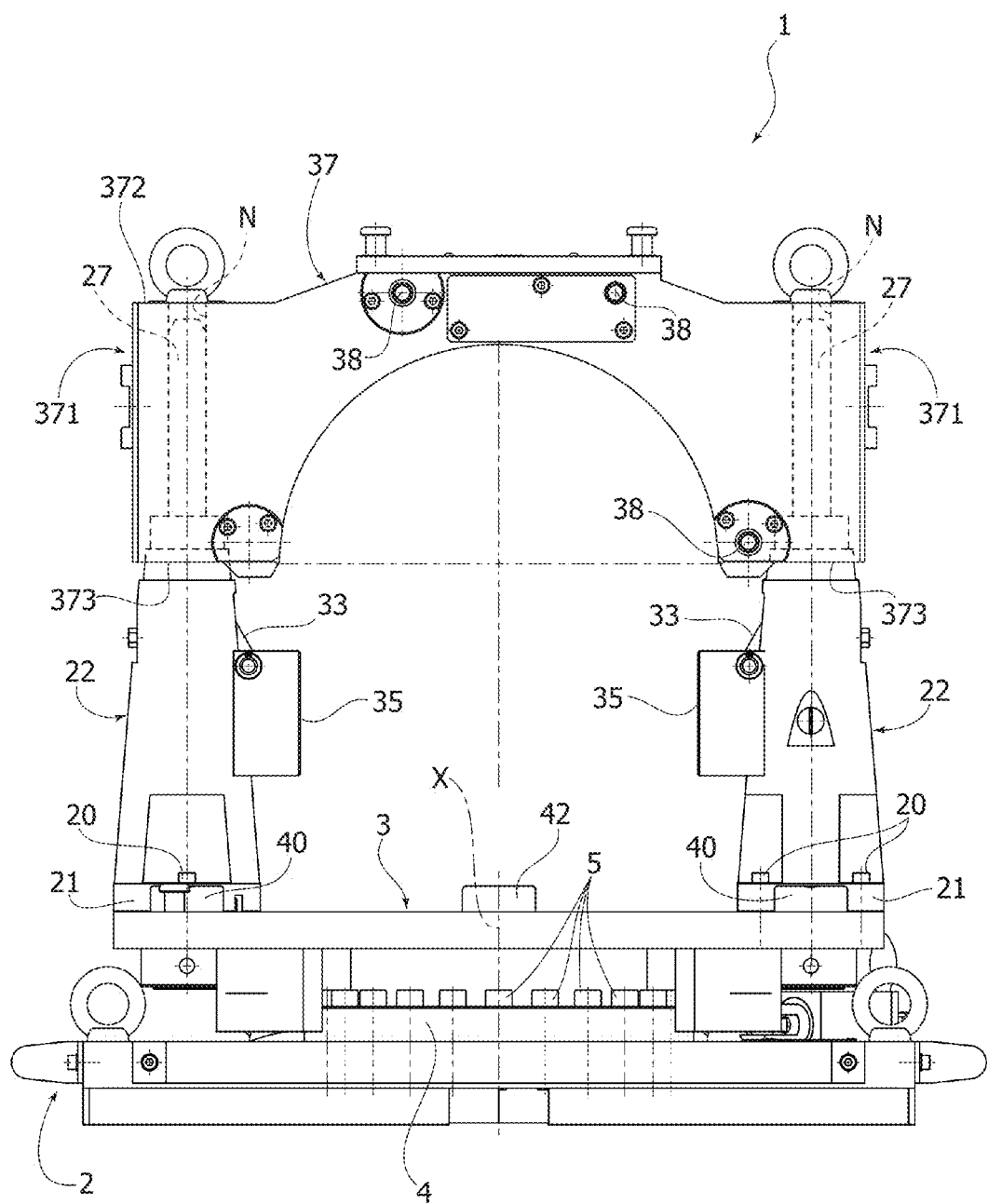
FIG. 4 is a front view of the pallet of FIG. 1.
Figure 5:
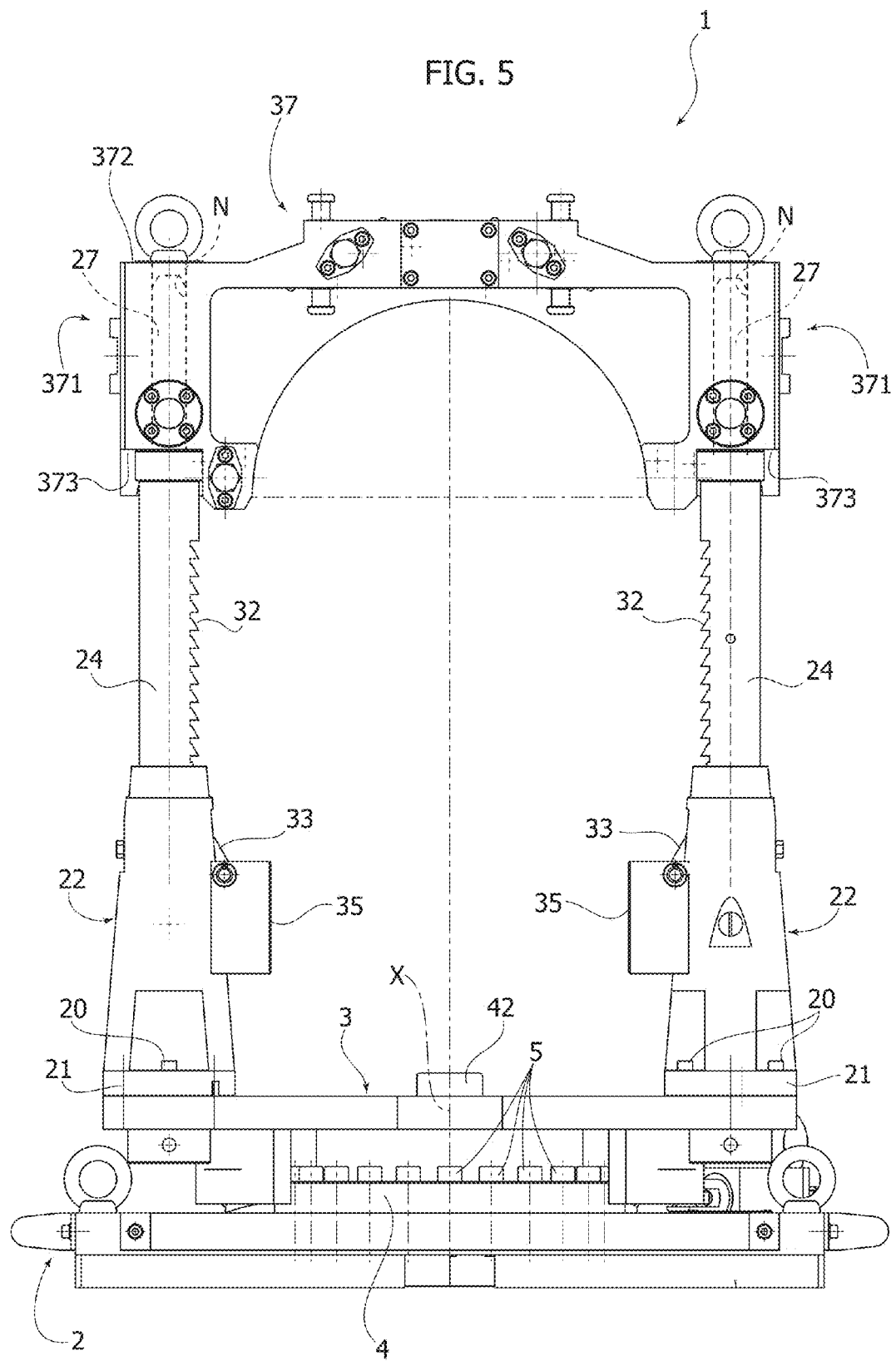
FIG. 5 is a front view similar to FIG. 4, which shows the pallet in a different operative configuration.

In the case of the illustrated example, the rotatable support for platform 3 is obtained by providing a rolling bearing 4, whose outer ring is secured by screws 5 to the base structure 2, and whose inner ring is secured by screws 6 to a disk 7 having a hub connected by screws 8 under the plate constituting the rotatable platform 3 (see FIG. 3).

Figure 1:
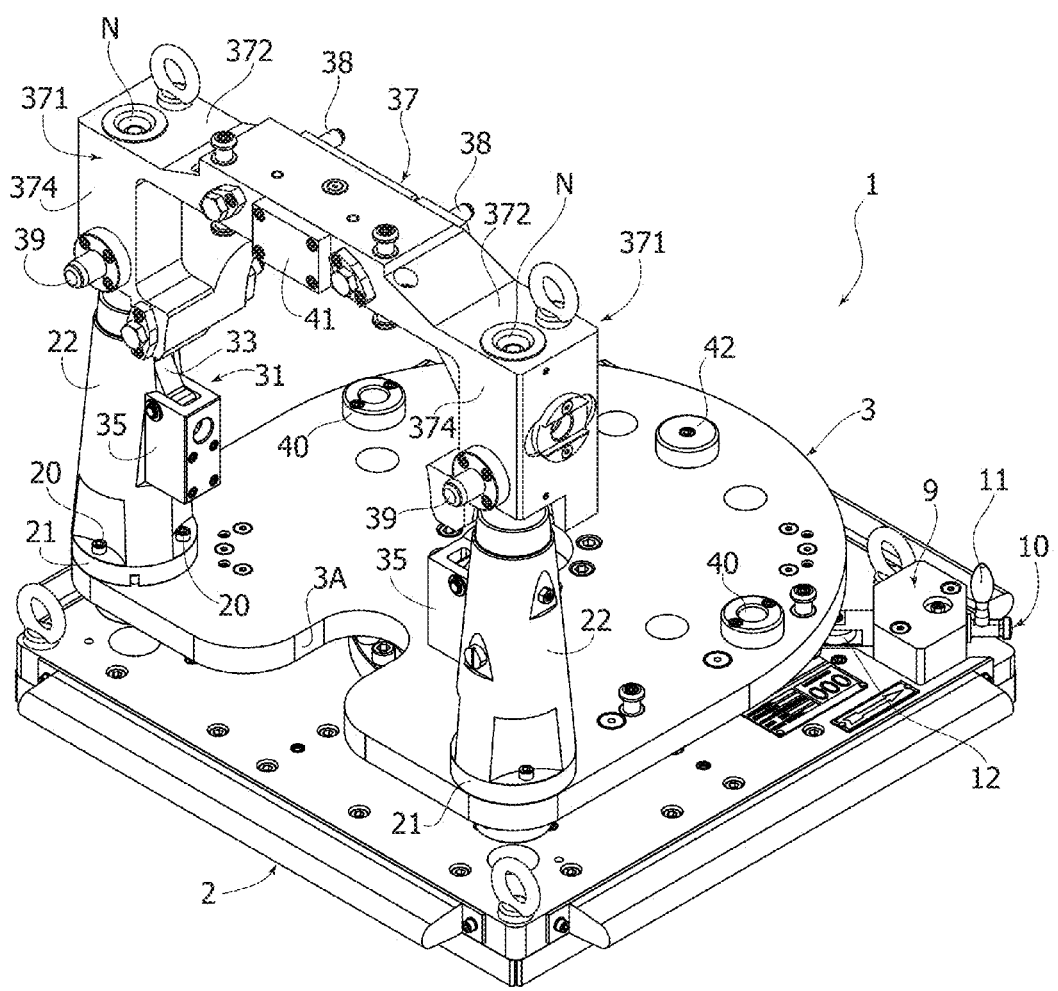
FIG. 1 is a perspective view of an embodiment of the pallet according to the invention, in a first operative configuration.
Figure 2:
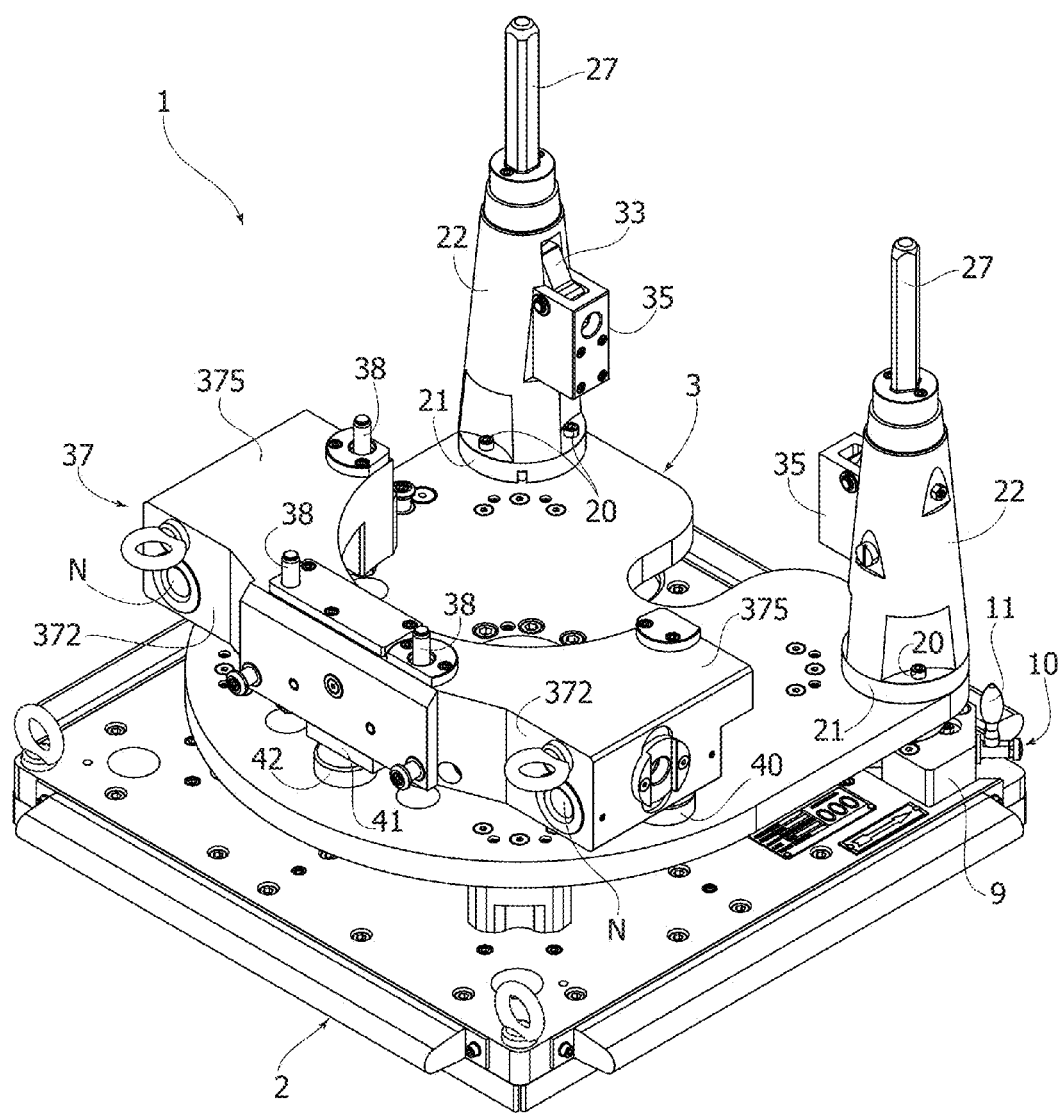
FIG. 2 is a perspective view of the pallet of FIG. 1, in a second operative configuration.
Figure 7:
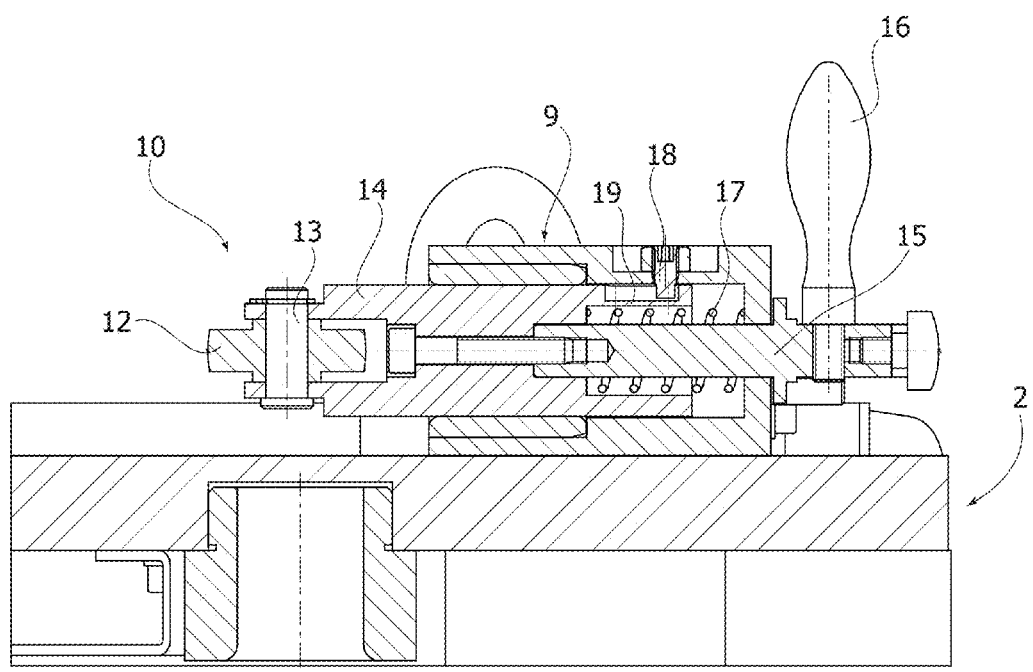
FIG. 7 is a view in cross-section and at an enlarged scale of a portion of FIG. 1.

The rotatable platform 3 can be rotated around the central axis X and can be locked in a selected position between a number of positions which are differently rotated around axis X, such as between two positions arranged at 180 degrees relative to each other. To this end, above the base structure 2 there is connected a block 9 within which a bolt device 10 is horizontally slidably mounted, the bolt device being provided with a knob 11 and having one active end carrying a freely rotatable roller 12, with a horizontal axis, adapted to cooperate with the lateral surface of the rotatable platform 3 and adapted to be engaged within a selected locating seat (not shown) between a number of seats provided on said lateral surface. FIG. 7 of the annexed drawings shows in cross-section one exemplary embodiment of the bolt device 10, with its roller 12 which is mounted by means of a pin 13 on the end of a body 14 slidably mounted within a horizontal cylindrical cavity of block 9. The body 14 is rigidly connected to a stem 15 to which the knob 16 is secured and is biased by a helical spring 17 towards a forwardly displaced end position, defined by the engagement of a pin 18 carried by block 9 within an axial slot 19 formed on the other surface of body 14. When one wants to position the rotatable platform 3 in a different angular position with respect to the central rotation axis X, it is possible to drive the rearward movement of roller 12 and the disengagement from the respective seat by operating the knob 16 manually, after which the knob 16 can be released, so that the roller 12 rolls on the lateral surface of the rotatable platform 3, during rotation of the latter, until it becomes engaged in the next seat. For example, FIG. 2 shows the rotatable platform 3 in position rotated by 180 degrees with respect to the position shown in FIG. 1.

In the specific case of the example shown in FIGS. 1-9, the rotatable platform 3 has a profile in plan view which is substantially quadrilateral, with one side defined by a semi-circular profile and the opposite side having a central notch 3A. At the two peripheral areas of the rotatable platform 3, which in the specific illustrated example are located at the ends of the side of the platform having the central notch 3A, there are fixed by screws 20 the base portions 21 of two vertical uprights 22. In the illustrated example, the uprights 22 have a shape tapered upwardly.

Figure 9:
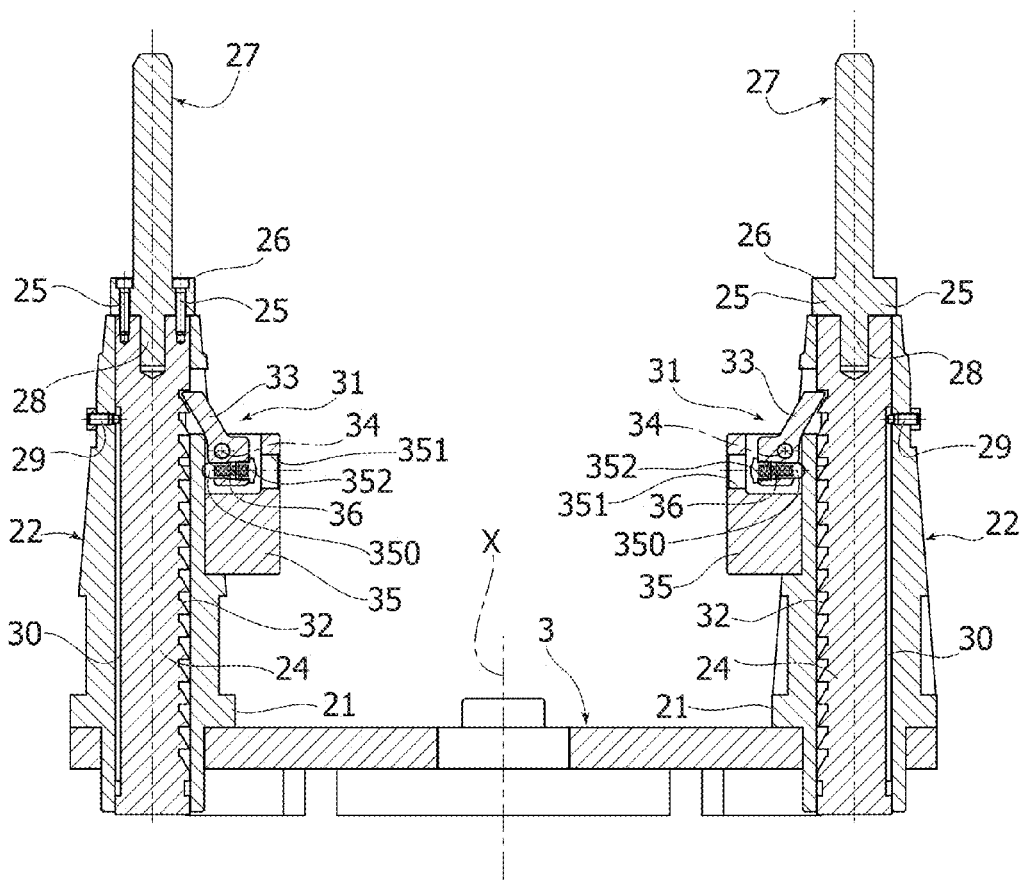
FIG. 9 is a view in cross-section of a component of the pallet.

FIG. 9 of the annexed drawings shows the rotatable platform 3 and the vertical uprights 22 in cross-section. Each upright 22 has a hollow body with an inner vertical cavity where there is slidably mounted a vertical column 24 having an upper end on which a base flange of a vertical locating pin 27 is connected by screws 25. Each pin 27 has an axial projection 28 extending from the lower surface of its base flange 26, which is received within a cooperating axial hole formed in the upper end surface of the respective column 24. FIG. 9 shows the two columns 24 in the lowered position, in which the base flanges 26 of the vertical locating pins 27 rest above a lower end surface of the two uprights 22. The opposite final raised end position of each column 24 is defined by the engagement of a pin 29 carried by the body of each upright 22 against the lower end of a longitudinal slot 30 formed on the lateral wall of each column 24.

Each column 24 can be locked both in its lowered position shown in FIG. 9 and in its final raised end position, as well as in a plurality of intermediate positions between said lowered position and said raised position, by means of a latch device 31.

Figure 6:
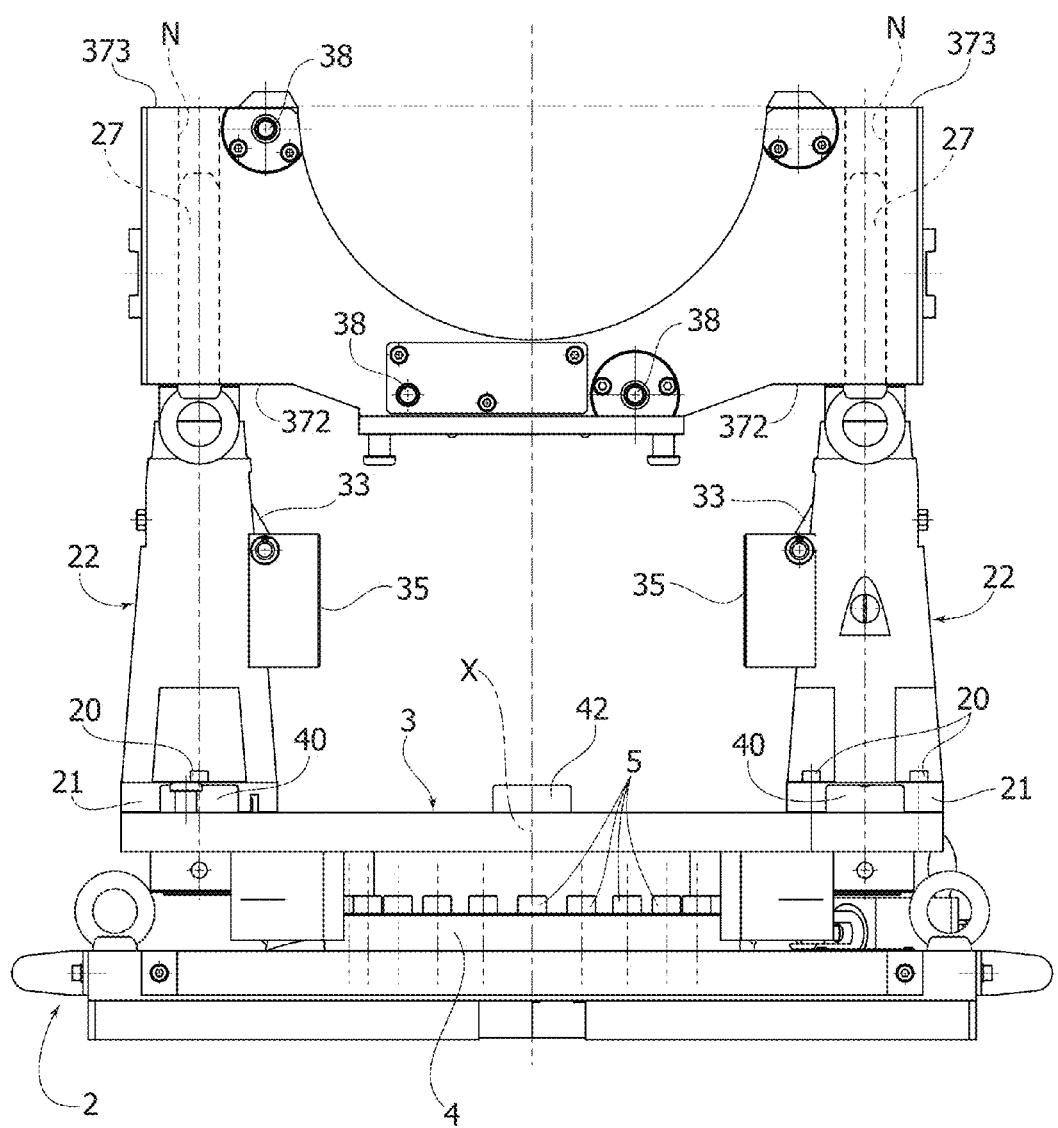
FIG. 6 is further front view of the pallet which shows a further different operative configuration.

In the case of the illustrated example, the latch device 31 is a ratchet device which comprises a vertical rack 32 formed on the lateral wall of each column 24, and a ratchet pawl 33 which is rotatably mounted around a horizontal axis 34 in a block 35 which is secured by screws on an outer face of each upright 22. The pawl 33 carries a slidable pin 350 which is in contact with the above mentioned planar face of the outer surface of upright 22. A helical spring 36 is operatively interposed between the slidable pin 350 and the body of pawl 33 for biasing the latter towards a position engaging a hollow between two subsequent teeth of the respective rack 32. The shape of the teeth of rack 32 and the shape of pawl 33 is such that each column 24 can be raised freely upwardly, thus causing jumping of the pawl 33 on the teeth of rack 32. However, once the pawl 33 has engaged a hollow between two subsequent teeth of the rack, the column 24 remains held in the reached position, with pawl 33 preventing its fall by gravity. With reference again to FIGS. 1-9, pallet 1 further comprises an arch-like cross-member 37 having two end portions 371 which can be removably positioned above the vertical locating pins 27 projecting from the upper ends of uprights 22. The end portions 371 each have an upper planar face 372, a lower planar face 373, a front planar face 374 and a rear planar face 375. The above mentioned end portions 371 of the arch-like cross-member 37 are each traversed by a through hole N opening at its ends on said upper and lower faces 372, 373. The arch-like cross-member 37 can be positioned above the locating pins 27 by coupling of these pins within said holes N, so as to position the cross-member 37 both in the position shown in FIG. 1 and in FIGS. 4, 5, with the planar faces 372 facing upwardly, and in an upturned position, rotated by 180 degrees around a horizontal axis extending along the direction of cross-member 37, as shown in FIG. 6.

From the rear face 375, visible in FIG. 2, of the arch-like cross-member 37, there project three screws 38, whose heads can be accessed at the opposite front face of cross-member 37, and which are to be engaged within corresponding threaded holes of an engine block, of the type diagrammatically shown (and designated by B in FIG. 8) which is to be conveyed along the assembly line. In this manner, the block B is rigidly connected to the arch-like cross-member 37. When the arch-like cross-member 37 is positioned above pins 27 in the position shown in FIG. 1, block B is supported by cross-member 37 in a position extending horizontally in a cantilever fashion, starting from the cross-member 37, at an elevated level with respect to the rotatable platform 3. This configuration is shown in the annexed FIG. 10, with reference to a simplified embodiment, in which there is not provided a rotatable platform and in which the cross-member 37 has a shape with a more accentuated arch.

Figure 10:
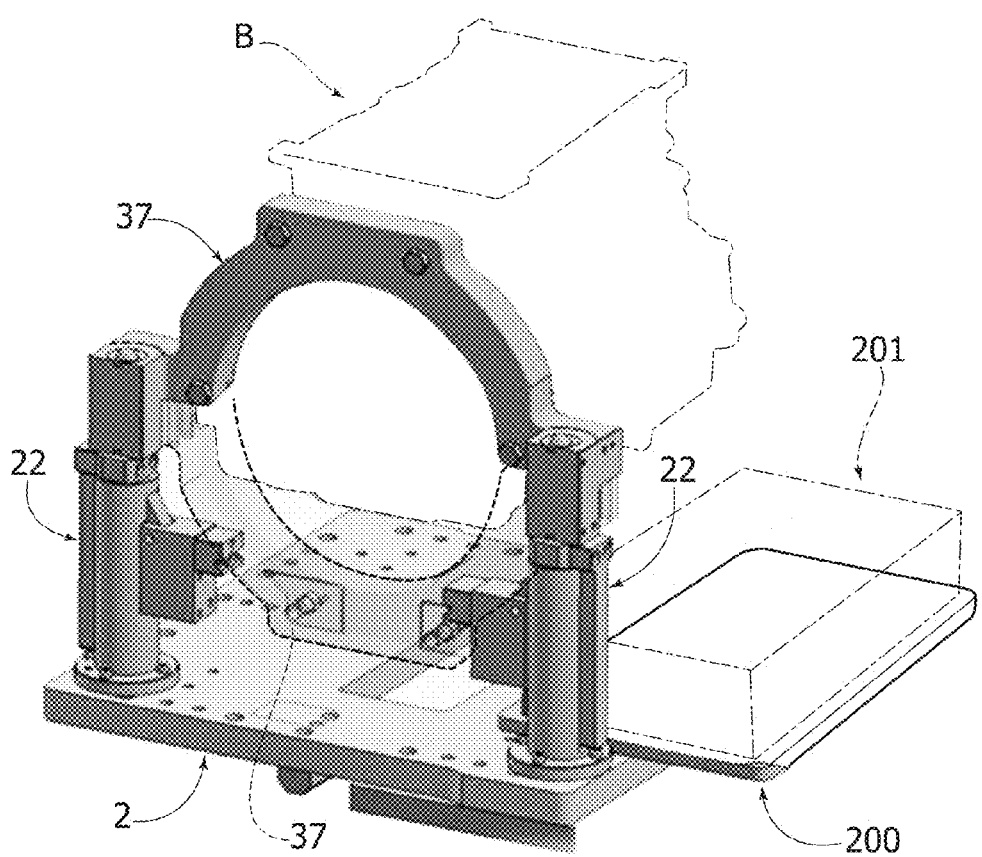
FIGS. 10, 11 show a further embodiment of the pallet according to the invention in two different configurations.
Figure 11:
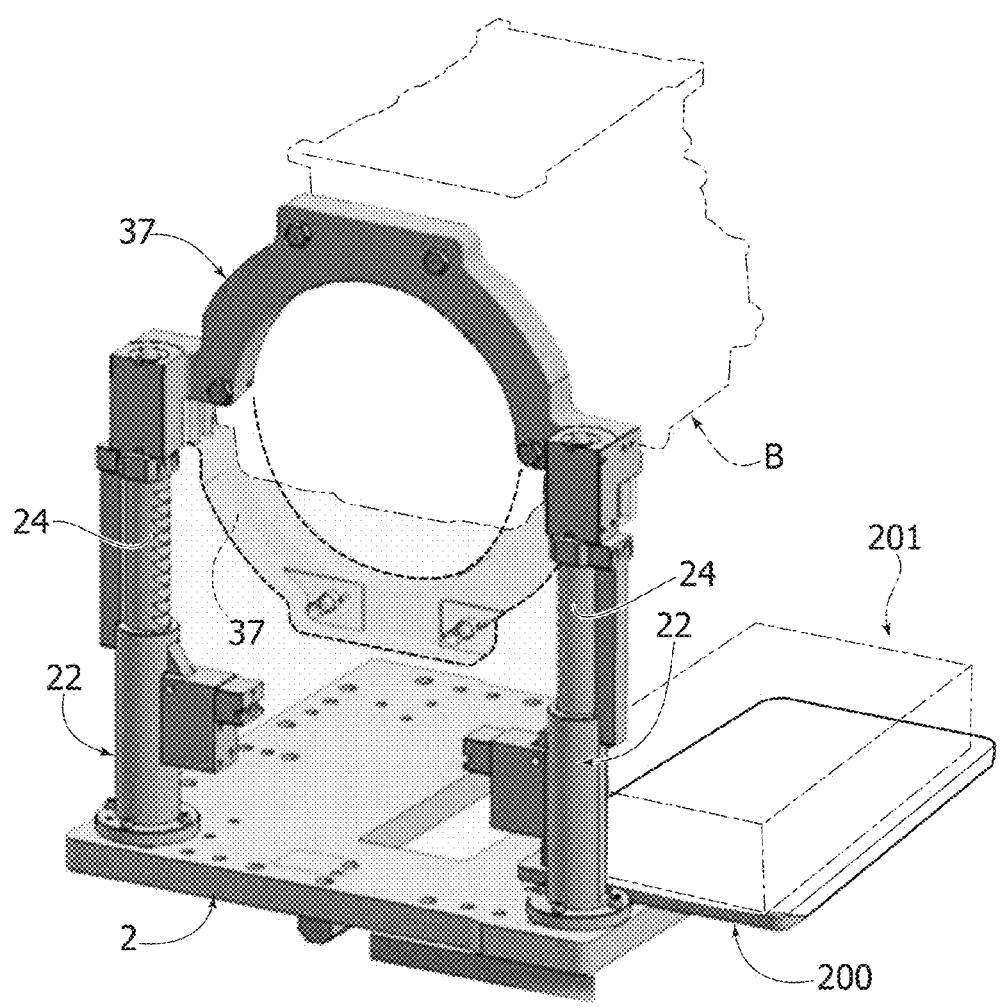

In the embodiment of FIGS. 10, 11, platform 3 is not rotatable and is identified in the base structure 2 itself, on which the uprights 22 are directly connected. Furthermore, in the example of FIG. 10, 11, to the base structure 2 there is associated a plate 200 carrying a further component 201 of the engine which is to be assembled to the bottom surface of the engine block B. FIG. 11 shows the same embodiment of FIG. 10, with columns 24 in a raised position, so as to hold the engine block B at a higher level, for example in order to render the assembly operations by an operator of greater height easier.

FIGS. 10, 11 show with dotted line also the assembly position of the arch-like cross-member 37 which is upturned by 180 degrees with respect to that shown with undotted line.

Naturally, the configuration of the pallet shown in FIGS. 10, 11 can be used by providing that the uprights 22 are carried by a rotatable platform mounted on the base structure 2, similarly to the embodiment of FIGS. 1-9.

The above described FIGS. 10, 11 clearly show that the arch-like configuration of the cross-member 37 renders also the end of the engine which is adjacent to the cross-member accessible from the operator.

Therefore, as shown, the pallet according to the invention renders both the upper side of the piece carried thereon, and the end adjacent to the cross-member 37, as well as the end which is opposite thereto, and also the two remaining sides of the piece, easily accessible.

The lower side can also be easily accessible by upturning the position of the cross-member 37 above the uprights 22 in the way shown in FIG. 6.

Moreover, if the operator is for example on the side of the pallet which is more remote from the cross-member 37, the rotatable platform 3 can be rotated by 180 degrees to bring the opposite end of the engine in front of the operator, thus rendering the related assembly operations (such as assembly of the engine flywheel on this end of the engine) easy.

As already indicated with reference to FIGS. 4, 5 and 10, 11 at each assembly station the arch-like cross-member 37 can be positioned at the most suitable height, also depending upon the needs of each single operator. To this end, where necessary, along the assembly line there are provided actuating means (not shown) adapted to engage pins 352 (FIG. 9) carried by the pawls and accessible through apertures 351 of blocks 35 to push the pawls 33 towards a disengagement position from the respective racks 32.

In this manner, the columns 24 and the vertical pins 27 projecting from their upper ends can be moved vertically until reaching the desired height. In this stage, the cross-member 37 carrying the piece and the columns 24 are engaged by one or more outer auxiliary equipments (not shown) adapted to support the weight thereof, until columns 24 are repositioned at the desired height.

Figure 12:
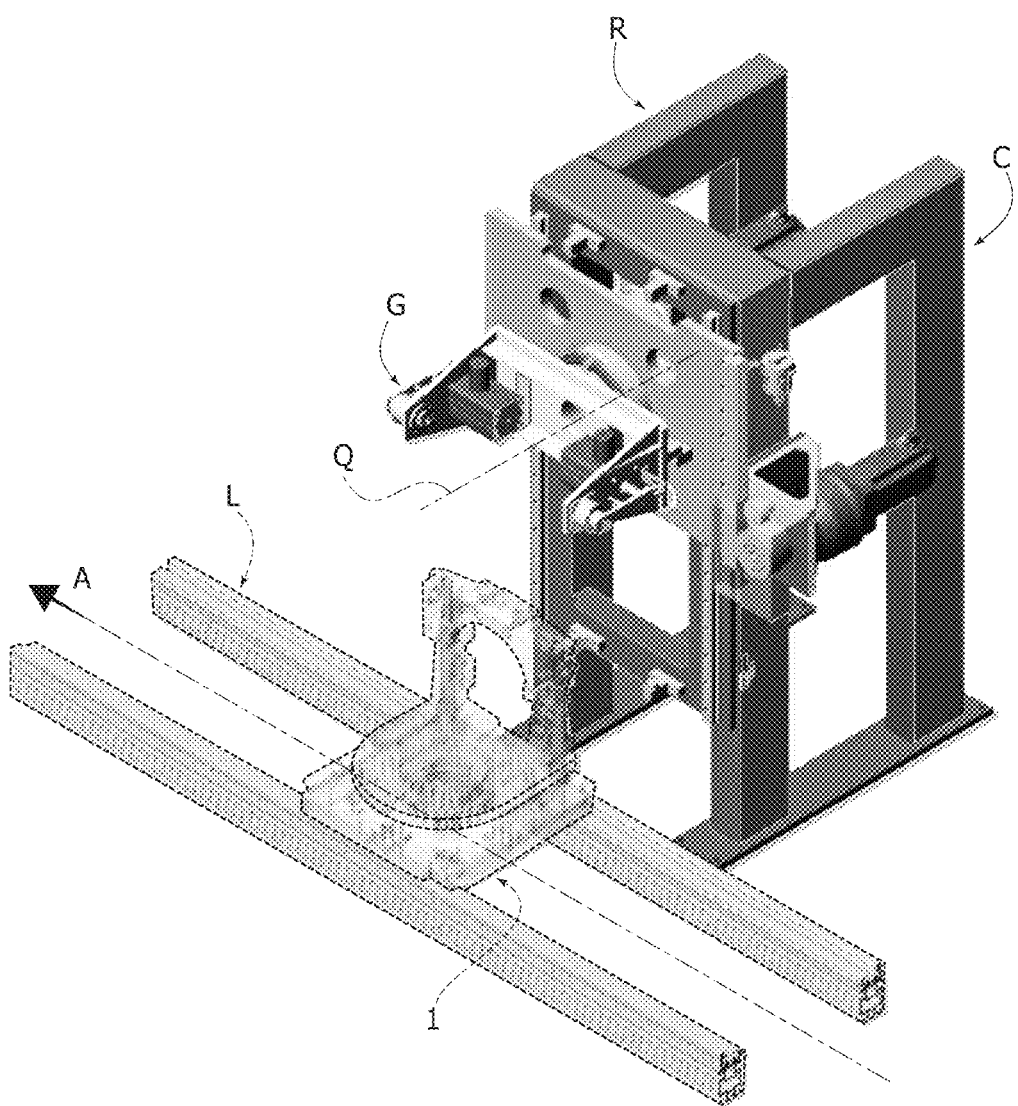
FIG. 12 shows a pallet according to the invention which is at a stop along the assembly line where an equipment is provided for picking up, upturning and repositioning the cross-member carrying the piece on the pallet columns.

When the cross-member 37 with the piece carried thereon must be upturned by 180 degrees, an automatic equipment for gripping and upturning the cross-member is used. To this end, along the conveyor line L (FIG. 12) in which each pallet 1 advances along a direction A there is provided an upturning station R with an equipment G provided with gripping members for gripping the opposite ends of the arch-like cross-member 37. The equipment G can be rotated around a horizontal axis Q and is carried by a slide S which is vertically guided on a supporting framework C. The details of construction relating to the motor means associated with the vertical slide S, the gripping member G which is rotatable around the horizontal axis Q, as well as the details of construction of the means for gripping the opposite ends of the arch-like cross-member 37 are not described herein, since they can be made in any known way, as it will be clear to the skilled experts in the art, and also because these constructive details do not fall, taken alone, within the scope of the present invention.

Figure 8:
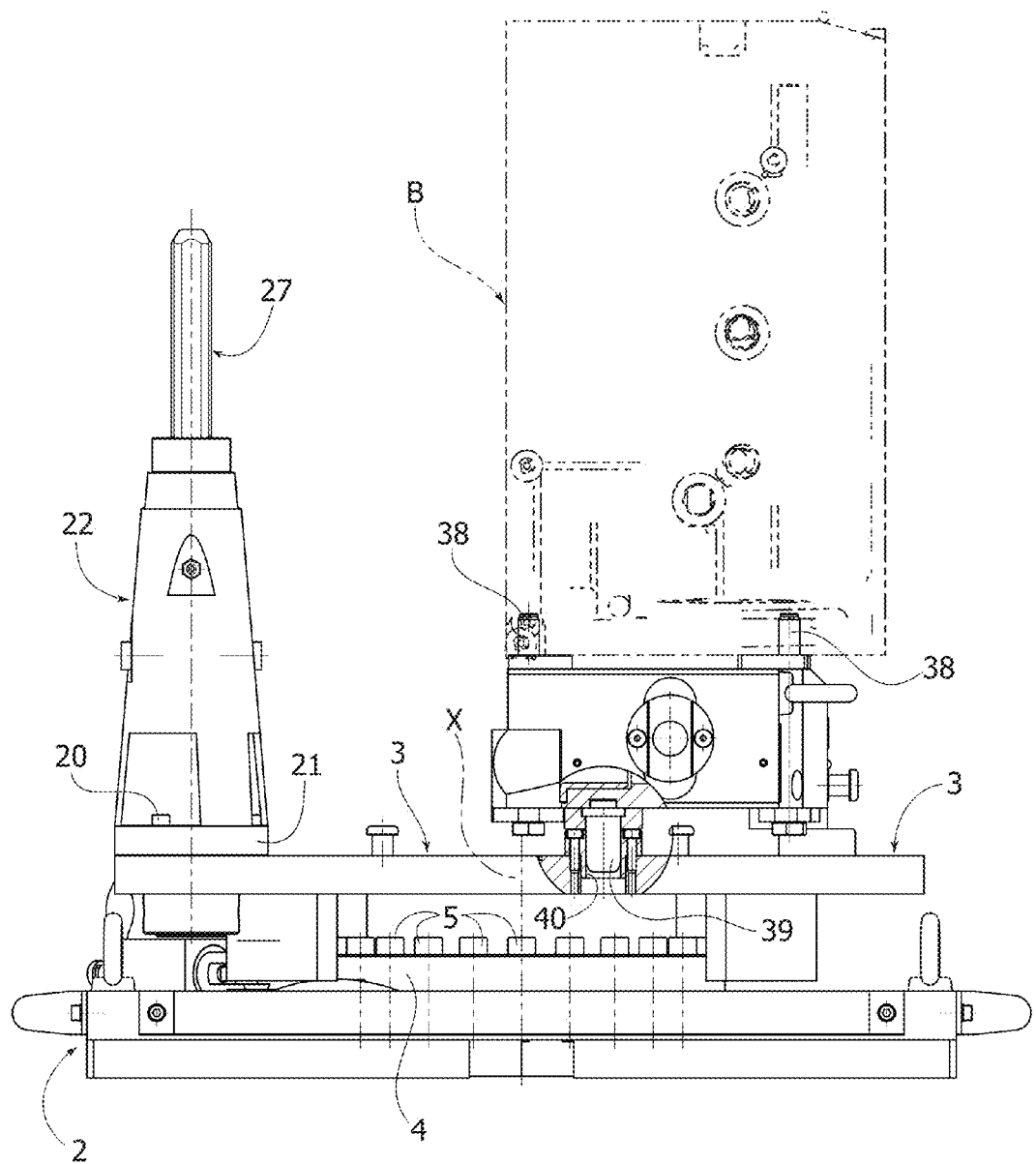
FIG. 8 is a left side elevational view of the pallet in the configuration of FIG. 2.

According to a further feature, the end portions 371 of the arch-like cross-member 37 have their front faces 374, lying in a plane arranged at 90 degrees with respect to the upper and lower faces 372, 373. These front faces 374 are provided with two coupling pins 39 adapted to be received within seats 40 provided on the rotatable platform 3, so as to hold the arch-like cross-member 7 locked in a position laying down on the rotatable platform 3, with a central plate 41 which rests on a support 42 of the platform 3 (FIGS. 2, 8). In this condition, the arch-like cross-member 37 is arranged with its rear face 375 and the screws 38 facing upwardly, so that the engine block B carried thereon extends vertically upwardly, as shown in FIG. 8. This configuration can be useful to favour assembly operations at the lower face of the engine block B, which is very convenient for the operator.

As clearly apparent from the foregoing description, the pallet according to the invention simultaneously provides a plurality of advantages. First of all, it enables maximum flexibility to be obtained in positioning and orienting the conveyed piece, which ensures easy access on each side of the piece, while enabling the operator to always operate in an easy and quick way, to advantage both of its physical well being and the productivity. Secondarily, the above mention results are achieved with an extremely simple and efficient structure, very reliable in operation.

Naturally, while the principle of the invention remains the same, the details of construction and the embodiments may widely varying with respect to what has been described purely by way of example, without departing from the scope of the present invention.

What is claimed is:

1. A pallet for conveying pieces or components in assembly lines, the pallet comprising:
   a base structure which is to be positioned on a conveyor line;
   a platform mounted above the base structure;
   a pair of vertical uprights which are spaced apart from each other and extend upwardly starting from two peripheral areas of said platform;
   a pair of vertical columns respectively supported within said vertical uprights and movable vertically between a lowered position and a raised position, each of said uprights being provided with latch means for locking the respective column in a vertical position selected between a plurality of selectable vertical positions between said lowered position and said raised position;
   an arch cross-member having end portions removably coupled with, and above, a vertical locating pin projecting from each upper end of said respective vertical columns, said arch cross-member having connecting means for supporting a piece or a component in a cantilever fashion at an elevated position with respect to a plane of said platform;
   the end portions of said arch- cross-member each defining an aperture for coupling with respective of the locating pin of said columns, the respective each end portion aperture positioned on both a first face and a second face which is opposite to the first face, wherein said arch- cross-member is adapted to be positioned on said vertical columns at any of two positions which are angularly positioned by 180 degrees relative to each other around a horizontal axis extending in a direction along a length of the arch cross-member, in order to orient the supported piece or component which has been removably connected to said arch- cross-member in the two different angular positions 180 degrees relative to each other.

2. The pallet according to claim 1, wherein said platform is rotatably mounted at a center of the platform above the base structure around a vertical axis, the platform further comprising bolt means for holding the platform locked in a position selected among two or more different positions around said vertical axis.

3. The pallet according to claim 1, wherein said arch cross-member further comprises a front face angularly positioned at 90 degrees apart from said first and second face, the arch cross member further having coupling elements adapted to cooperate with coupling seats positioned on an upper surface of said platform, so as to hold said arch cross member locked in a position laid down above the platform with the supported piece or component connected thereto extending vertically upwardly.

4. The pallet according to claim 3, wherein said connecting means further comprise screws selectively engaged within threaded holes defined by the supported piece or component, said screws projecting from a rear face of said arch cross-member positioned opposite the arch cross-member front face having said coupling elements.

5. The pallet according to claim 1, wherein said latch means comprises:
   a ratchet device including a vertical rack positioned on each column; and
   a ratchet pawl connected to each vertical upright, each ratchet pawl cooperating with said respective vertical rack.

6. The pallet according to claim 5, wherein each rack further comprises a plurality of sequentially spaced teeth, the teeth having a downward angle defining a hollow between adjacent teeth so that they enable a free raising movement of the respective column, causing a jumping movement of said ratchet pawl between the adjacent teeth on the rack, said pawl preventing a fall by gravity force of the respective column once the pawl has become engaged in the respective hollow between two adjacent teeth of the rack to hold the column at a selected position.

* * * * *